(12) United States Patent
Nakahara et al.

(10) Patent No.: US 6,402,281 B1
(45) Date of Patent: Jun. 11, 2002

(54) IMAGE PROCESSING METHOD AND DEVICE AND IMAGE FORMATION DEVICE

(75) Inventors: Nobuhiko Nakahara; Hiroki Umezawa, both of Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/313,019

(22) Filed: May 17, 1999

(30) Foreign Application Priority Data

May 22, 1998 (JP) .......................................... 10-141259
Mar. 19, 1999 (JP) .......................................... 11-076315

(51) Int. Cl.$^7$ ............................................... B41J 2/205
(52) U.S. Cl. ....................................................... 347/15
(58) Field of Search ............................. 347/15, 14, 12, 347/43, 100; 358/523, 462, 298, 502

(56) References Cited

U.S. PATENT DOCUMENTS 5,497,180 A 3/1996 Kawakami et al.
6,024,438 A * 2/2000 Koike et al.

FOREIGN PATENT DOCUMENTS

JP         5-336373      12/1993
JP         10-257320      9/1998

* cited by examiner

*Primary Examiner*—Raquel Yvette Gordon
(74) *Attorney, Agent, or Firm*—Frishauf, Holtz, Goodman & Chick, P.C.

(57) ABSTRACT

In a multilevel error diffusion process, an input image signal Din with tones and an image correction signal Ecd are added together to produce a corrected image signal Dinc, which in turn is converted into an eight-level image signal to provide an output image signal Dout with eight tones. To convert the input image signal into the output image signal, there are provided a plurality of conversion tables and a switching means for selectively switching the conversion tables at random. The conversion tables are switched with each pixel in the corrected image signal.

27 Claims, 8 Drawing Sheets

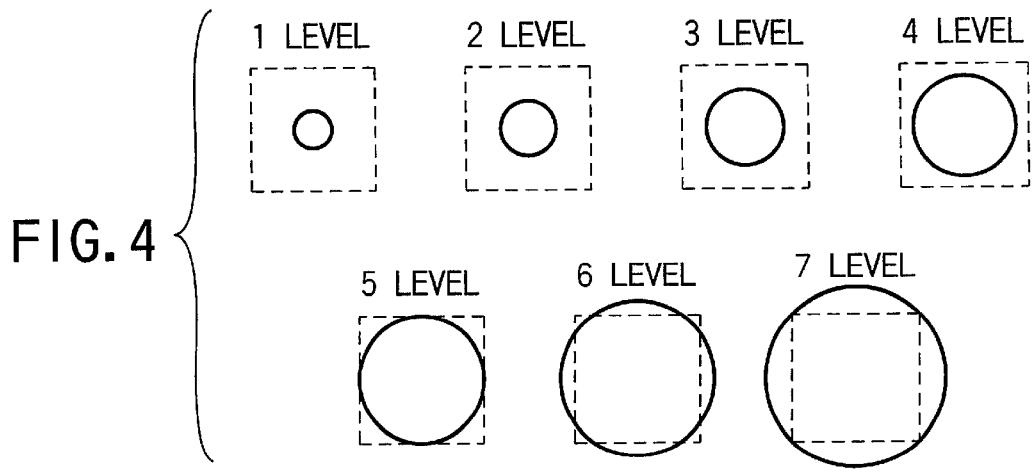
FIG. 4
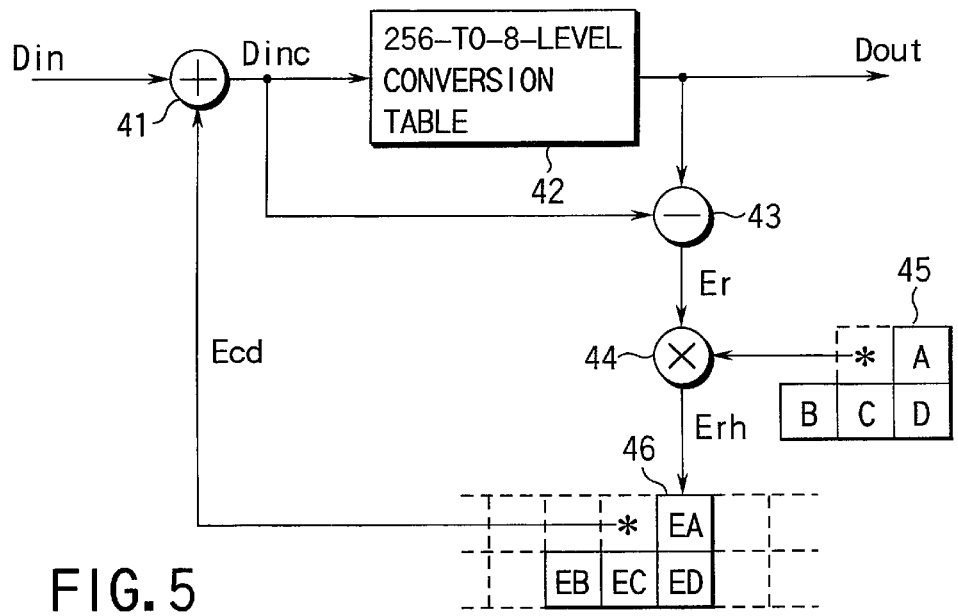
FIG. 5
FIG. 6A
FIG. 6B

| | 51 CONVERSION TABLE | | 52 CONVERSION TABLE | | 53 CONVERSION TABLE | | 54 CONVERSION TABLE | | 55 CONVERSION TABLE | |
|---|---|---|---|---|---|---|---|---|---|---|
| | THRESHOLD | OUTPUT VALUE | THRESHOLD | OUTPUT VALUE | THRESHOLD | OUTPUT VALUE | THRESHOLD | OUTPUT VALUE | THRESHOLD | OUTPUT VALUE |
| | | 0 | | 0 | | 0 | | 0 | | 0 |
| Th1 | 18 | ... | 18 | ... | 18 | ... | 18 | ... | 18 | ... |
| | | 1 | | 1 | | 1 | | 1 | | 1 |
| Th2 | 38 | ... | 46 | ... | 54 | ... | 62 | ... | 70 | ... |
| | | 2 | | 2 | | 2 | | 2 | | 2 |
| Th3 | 59 | ... | 75 | ... | 91 | ... | 107 | ... | 123 | ... |
| | | 3 | | 3 | | 3 | | 3 | | 3 |
| Th4 | 80 | ... | 104 | ... | 128 | ... | 152 | ... | 176 | ... |
| | | 4 | | 4 | | 4 | | 4 | | 4 |
| Th5 | 116 | ... | 140 | ... | 164 | ... | 188 | ... | 212 | ... |
| | | 5 | | 5 | | 5 | | 5 | | 5 |
| Th6 | 169 | ... | 185 | ... | 201 | ... | 217 | ... | 233 | ... |
| | | 6 | | 6 | | 6 | | 6 | | 6 |
| Th7 | 229 | ... | 233 | ... | 237 | ... | 241 | ... | 245 | ... |
| | | 7 | | 7 | | 7 | | 7 | | 7 |

FIG. 9

|  | 51₁ | | 52₁ | | 53₁ | | 54₁ | | 55₁ | |
|---|---|---|---|---|---|---|---|---|---|---|
|  | CONVERSION TABLE | | CONVERSION TABLE | | CONVERSION TABLE | | CONVERSION TABLE | | CONVERSION TABLE | |
|  | THRESHOLD | OUTPUT VALUE | THRESHOLD | OUTPUT VALUE | THRESHOLD | OUTPUT VALUE | THRESHOLD | OUTPUT VALUE | THRESHOLD | OUTPUT VALUE |
|  |  | 0 |  | 0 |  | 0 |  | 0 |  | 0 |
| Th1 | 18 | ... | 18 | ... | 18 | ... | 18 | ... | 18 | ... |
|  |  | 1 |  | 1 |  | 1 |  | 1 |  | 1 |
| Th2 | 46 | ... | 50 | ... | 54 | ... | 58 | ... | 62 | ... |
|  |  | 2 |  | 2 |  | 2 |  | 2 |  | 2 |
| Th3 | 75 | ... | 83 | ... | 91 | ... | 99 | ... | 107 | ... |
|  |  | 3 |  | 3 |  | 3 |  | 3 |  | 3 |
| Th4 | 104 | ... | 116 | ... | 128 | ... | 140 | ... | 152 | ... |
|  |  | 4 |  | 4 |  | 4 |  | 4 |  | 4 |
| Th5 | 140 | ... | 152 | ... | 164 | ... | 176 | ... | 188 | ... |
|  |  | 5 |  | 5 |  | 5 |  | 5 |  | 5 |
| Th6 | 185 | ... | 193 | ... | 201 | ... | 209 | ... | 217 | ... |
|  |  | 6 |  | 6 |  | 6 |  | 6 |  | 6 |
| Th7 | 233 | ... | 235 | ... | 237 | ... | 239 | ... | 241 | ... |
|  |  | 7 |  | 7 |  | 7 |  | 7 |  | 7 |

FIG. 10

| | 51₂ | | 52₂ | | 53₂ | | 54₂ | | 55₂ | |
|---|---|---|---|---|---|---|---|---|---|---|
| | CONVERSION TABLE | | CONVERSION TABLE | | CONVERSION TABLE | | CONVERSION TABLE | | CONVERSION TABLE | |
| | THRESHOLD | OUTPUT VALUE | THRESHOLD | OUTPUT VALUE | THRESHOLD | OUTPUT VALUE | THRESHOLD | OUTPUT VALUE | THRESHOLD | OUTPUT VALUE |
| | | 0 | | 0 | | 0 | | 0 | | 0 |
| Th1 | 18 | ... | 18 | ... | 18 | ... | 18 | ... | 18 | ... |
| | | 1 | | 1 | | 1 | | 1 | | 1 |
| Th2 | 42 | ... | 48 | ... | 54 | ... | 60 | ... | 66 | ... |
| | | 2 | | 2 | | 2 | | 2 | | 2 |
| Th3 | 67 | ... | 79 | ... | 91 | ... | 103 | ... | 115 | ... |
| | | 3 | | 3 | | 3 | | 3 | | 3 |
| Th4 | 92 | ... | 110 | ... | 128 | ... | 146 | ... | 164 | ... |
| | | 4 | | 4 | | 4 | | 4 | | 4 |
| Th5 | 128 | ... | 146 | ... | 164 | ... | 182 | ... | 200 | ... |
| | | 5 | | 5 | | 5 | | 5 | | 5 |
| Th6 | 177 | ... | 189 | ... | 201 | ... | 213 | ... | 225 | ... |
| | | 6 | | 6 | | 6 | | 6 | | 6 |
| Th7 | 231 | ... | 234 | ... | 237 | ... | 240 | ... | 243 | ... |
| | | 7 | | 7 | | 7 | | 7 | | 7 |

FIG. 11

| | 60 ||
|---|---|---|
| | CONVERSION TABLE ||
| | THRESHOLD | OUTPUT VALUE |
| | | 0 |
| Th1 | 18 | ... |
| | | 1 |
| Th2 | 54 | ... |
| | | 2 |
| Th3 | 91 | ... |
| | | 3 |
| Th4 | 128 | ... |
| | | 4 |
| Th5 | 164 | ... |
| | | 5 |
| Th6 | 201 | ... |
| | | 6 |
| Th7 | 237 | ... |
| | | 7 |

FIG. 12A

| | 61 || 62 || 63 ||
|---|---|---|---|---|---|---|
| | CONVERSION TABLE || CONVERSION TABLE || CONVERSION TABLE ||
| | THRESHOLD | OUTPUT VALUE | THRESHOLD | OUTPUT VALUE | THRESHOLD | OUTPUT VALUE |
| | | 0 | | 0 | | 0 |
| Th1 | 18 | ... | 18 | ... | 18 | ... |
| | | 1 | | 1 | | 1 |
| Th2 | 46 | ... | 54 | ... | 62 | ... |
| | | 2 | | 2 | | 2 |
| Th3 | 75 | ... | 91 | ... | 107 | ... |
| | | 3 | | 3 | | 3 |
| Th4 | 104 | ... | 128 | ... | 152 | ... |
| | | 4 | | 4 | | 4 |
| Th5 | 140 | ... | 164 | ... | 188 | ... |
| | | 5 | | 5 | | 5 |
| Th6 | 185 | ... | 201 | ... | 217 | ... |
| | | 6 | | 6 | | 6 |
| Th7 | 233 | ... | 237 | ... | 241 | ... |
| | | 7 | | 7 | | 7 |

FIG. 12B

IMAGE PROCESSING METHOD AND DEVICE AND IMAGE FORMATION DEVICE

BACKGROUND OF THE INVENTION

The present invention relates to an image processing method and device and an image formation device which converts input multilevel image data into multilevel image data with a smaller number of tones through a multilevel error diffusion process.

Conventionally, with image formation devices, such as printers, that use line heads such as line LED (light emitting diode) heads, line thermal heads, and line ink jet heads, dots of the same size are printed at a resolution inherent in the head used onto recording paper to form a bilevel image. With the line LED heads having a number of LEDs arranged in a horizontal line, the resolution corresponds to the spacing between each LED in the raster direction. Likewise, with the line thermal heads having a number of heating resistor elements arranged in a horizontal line, the resolution corresponds to the spacing between each heating element in the raster direction. With the line ink jet heads having a number of ink nozzles arranged in a horizontal line, the resolution corresponds to the spacing between each nozzle in the raster direction.

In these image formation devices, character images are simply reproduced as bilevel images with the specified resolution of their heads, while photographic images are reproduced through the use of halftoning such as ordered dither method or error diffusion method. In the halftoning process in this case, it is very difficult to make the maintenance of a high resolution and the reproduction of a high tone levels compatible with each other. In the ordered dither method in particular, resolution and tone levels conflict with each other.

A line head-based image formation device has recently made its advent which can represent one pixel with a few tone levels by using multi-valued image data and modulating the printing area within one pixel. FIG. 15 shows a recording head having a number of recording elements arranged in a horizontal line and examples of dots recorded by the recording head 1. For simplicity, in the example of FIG. 15, one pixel takes one of three values, including white. Arranging four or three such recording heads in parallel allows color images to be recorded by combinations of four colors of cyan (C), magenta (M), yellow (Y), and black (K) or three colors of C, M, and Y.

Such image formation devices that allow for the recording of multilevel image data perform various image processes, such as color conversion, undercolor removal (UCR) and/or gamma (γ) correction, and then, in order to reproduce a specified number of tones inherent in the printer engine that actually performs image printing operations, perform multilevel halftoning using screen angle such as multilevel dithering or multilevel error diffusion process, thereby obtaining multilevel image data having several bits for each pixel. And the devices effect an improvement in image reproducibility by allowing one pixel to contain more information content.

In general, the ordered dither process is a light and fast process and can effect cost saving. In comparison with the dithering, on the other hand, the error diffusion method is complex but superior in image quality. The error diffusion method has been extensively used because its complexity has recently been solved by advances in LSI technology.

In many cases, line heads of ink jet line printers have variations in the volume and direction of ejected ink from each ink nozzle. In order to reduce such variations below a constant value, extremely high accuracy is required in manufacture, resulting in very high manufacturing cost. On practical side, it is therefore inevitable that the variations in the volume and direction of ejected ink occur from each ink nozzle. In the presence of such variations, dots formed by ink nozzles that tend to make large dots or adjacent dots the spacing of which is smaller than a standard value make the density of that portion high. On the other hand, dots formed by ink nozzles that tend to make small dots or adjacent dots the spacing of which is larger than a standard value make the density of that portion low or produce a white stripe in that portion. In either case, density nonuniformity occur, resulting in degradation of image quality.

In order to prevent such degradation of image quality, use has hitherto been made of an approach to, as in thinned-out printing in the checkered form, control the production of density nonuniformity appearing in the form of a stripe in particular by, for lines in the sub-scanning direction in which direction paper is fed, printing each line through the use of two or more ink nozzles instead of printing by a corresponding one of the ink nozzles to vary the dot size or the spacing between adjacent dots.

Such an approach allows density nonuniformity to be reduced to some degree but not enough. In particular, in the case of a type of line printer that allows one pixel to be represented in several tone levels by modulating the printing area within one pixel using multilevel image data, if a multilevel image is reproduced with dots of such intermediate size that adjacent dots barely come into contact with each other, there arises a problem that density nonuniformity in the form of a stripe becomes significantly noticeable. In view of the human visual system that is very sensitive to horizontal and vertical lines, it is quite possible that slight positional displacement is recognized as density nonuniformity in the form of a stripe.

There is another approach to control density nonuniformity by finding characteristic values for each ink nozzle in advance through test printing, storing corrections for all the ink nozzles in memory, and, at the time of printing, correcting the printing characteristics of each ink nozzle. The application of this approach to a print head, such as a line head in which a large number of ink nozzles are arranged, requires a very large capacity memory to store the corrections. In addition, a driver LSI for correcting the printing characteristics is required to have significant control capabilities. Thus, the approach is difficult to implement.

BRIEF SUMMARY OF THE INVENTION

It is an object of the present invention to provide an image processing method which, in a range of low tone levels in which stripes and density nonuniformity are relatively difficult to be noticed, maintains the substantial resolution by reproducing dots of the same size for image data of the same level and, in a range from medium to high tone levels, reduces density nonuniformity by reproducing dots of multiple sizes for image data of the same level, and moreover is easy to implement.

According to a first aspect of the present invention, there is provided an image processing method for converting input multilevel image data in which each pixel consists of M bits of data into output multilevel image data in which each pixel consists of N (M>N≧1) bits of data so that the output multilevel image data has a smaller number of tone levels than the input multilevel image data through a multilevel error diffusion process and producing dot patterns according to the tone levels of the output multilevel image data, wherein the multilevel error diffusion processing is such that, when the input multilevel image data is in a range from medium to high tone levels, the types of dot patterns produced by the output multilevel image data are larger in number than those produced when the input multilevel image data is in a range of low tone levels.

It is another object of the present invention to provide an image processing device which, in a range of low tone levels in which stripes and density nonuniformity are relatively difficult to be noticed, maintains the substantial resolution by reproducing dots of the same size for image data of the same level and, in a range from medium to high tone levels, reduces density nonuniformity by reproducing dots of multiple sizes for image data of the same level, and moreover is easy to implement.

According to a second aspect of the present invention, there is provided an image processing device comprising: a plurality of conversion tables connected to receive input multilevel image data in which each pixel consists of M bits of data for converting it into output multilevel image data in which each pixel consists of N bits of data, the conversion tables having different conversion threshold settings for multilevel image data in a range from medium to high tone levels; switching means for selectively switching the conversion tables for use in conversion of the input multilevel image data; and multilevel error diffusion process means for performing a multilevel error diffusion process using the conversion tables selected by the switching means to convert the M-bit input multilevel image data into the N-bit output multilevel image data.

It is another object of the present invention to provide an image formation device which, in a range of low tone levels in which stripes and density nonuniformity are relatively difficult to be noticed, maintains the substantial resolution by reproducing dots of the same size for image data of the same level and, in a range from medium to high tone levels, reduces density nonuniformity by reproducing dots of multiple sizes for image data of the same level, and moreover is easy to implement.

According to a third aspect of the present invention, there is provided an image formation device comprising: a plurality of conversion tables connected to receive input multilevel image data in which each pixel consists of M bits of data for converting it into output multilevel image data in which each pixel consists of N bits of data, the conversion tables having different conversion threshold settings for multilevel image data in a range from medium to high tone levels; switching means for selectively switching the conversion tables for use in conversion of the input multilevel image data; multilevel error diffusion process means for performing a multilevel error diffusion process using the conversion tables selected by the switching means to convert the M-bit input multilevel image data into the N-bit output multilevel image data; and printing means for printing according to the N bits image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows image dot sizes for gradations in the first embodiment;

FIG. 5 is a diagram for use in explanation of a basic algorithm for multilevel error diffusion used in the halftone processing section in the first embodiment;

FIGS. 6A and 6B show examples of error diffusion coefficients to be stored in the weight coefficient storage section used in the multilevel error diffusion processing of FIG. 5;

FIG. 9 shows an example of a multilevel-to-octal conversion table in the first embodiment;

FIG. 10 shows another example of a multilevel-to-octal conversion table in the first embodiment;

FIG. 11 shows still another example of a multilevel-to-octal conversion table in the first embodiment;

FIGS. 12A and 12B show an example of a multilevel-to-octal conversion table in a second embodiment of the present invention;

DETAILED DESCRIPTION OF THE INVENTION

Hereinafter, the preferred embodiments of the present invention will be described with reference to the drawings.

This embodiment will be described in terms of an application of the image formation device to a color ink jet printer.

[First Embodiment]

Figure 1:
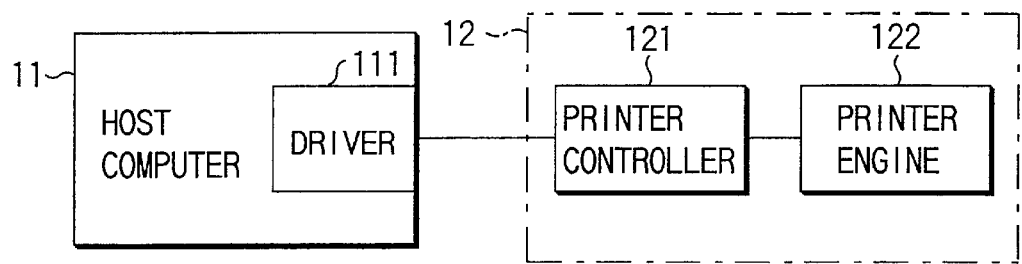
FIG. 1 is a block diagram of a first embodiment of the present invention.

FIG. 1 is a block diagram illustrating the entire hardware configuration. A host computer 11 transmits to a color ink jet printer 12 color image data in which one pixel consists of M bits of data. More specifically, the host computer 11 transmits code and raster data from its driver 111 to a printer controller 121 of the printer 12 to match the characteristics of interface to the printer. In the printer 12, the printer controller 121 drives a printer engine 122 in a controlled manner.

The printer controller 121 expands coded image data (for example, a page description language such as PDL) from the host computer 11 to a bit map, performs image processing on it, and then stores it into a built-in page memory. The printer engine 122 converts bit-mapped image data from the printer controller 121 to drive signals, which, in turn, feed printing paper and drive the color ink jet head for printing an image onto the paper.

It is not necessarily required that the printer 12 have a one-to-one correspondence with the host computer 11. The printer may be used with the currently wide-spread network as a networked printer. In this case, a one-to-many relationship results. The interface between the printer controller 121 and the printer engine 122 is one that is dependent basically on the printer architecture, not one that is specified.

Figure 2:
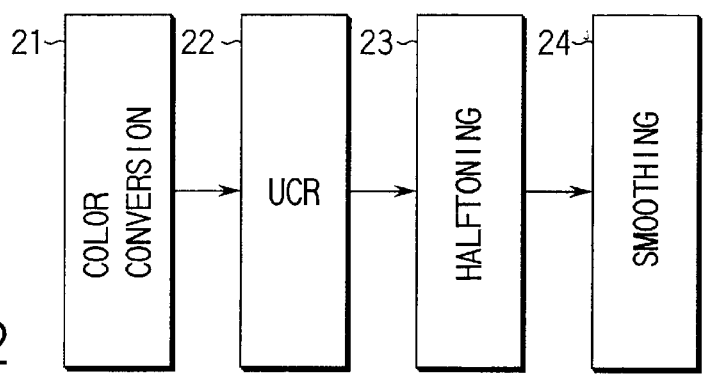
FIG. 2 is a block diagram of an image processing section in the printer controller in the first embodiment.

Referring now to FIG. 2, there is illustrated, in block diagram form, an arrangement of the image processing unit in the printer controller. The image processing unit comprises a color conversion section 21, a UCR (under color removal) section 22, a halftone processing section 23, and a smoothing section 24. First, the color conversion section 21 transforms input color image data in which one pixel consists of M bits of data, for example, RGB color signals standard with color monitors of 8 bits for each color, into CMY components adapted for the printer 12. R, G and B indicate red, green, and blue, respectively, whereas C, M and Y indicate cyan, magenta, and yellow, respectively.

Next, the UCR section 22 extracts a black component from the CMY colors, determines after CMY colors, and finally transforms them into CMYK colors where K indicates black. The halftone processing section 23 performs a multilevel error diffusion process on each color component and transforms one-pixel data into multilevel image data with a smaller number of gradations in which each color component is represented by N (M>N≧1) bits, for example, 3 bits, to conform to the printing capability of the printer 12. The smoothing section 24 interpolates edge portions for each color component to reduce and to smooth jugged lines.

Figure 3:
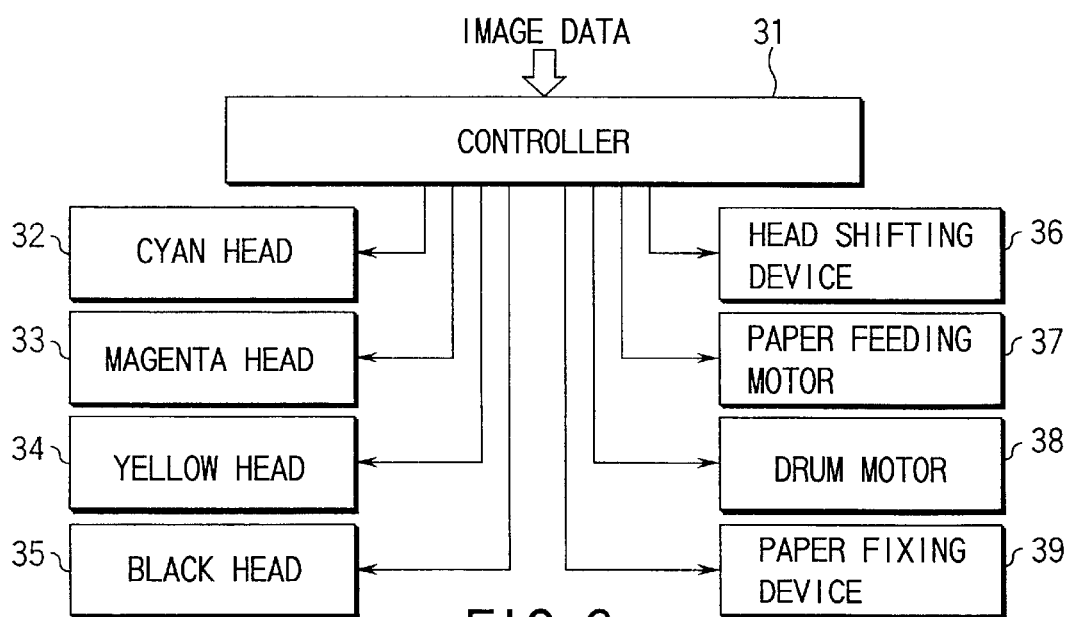
FIG. 3 is a block diagram of the printer engine in the first embodiment.

FIG. 3 shows the hardware configuration of the printer engine 122, which is equipped with a controller 31. In response to the multilevel image data of 3 bits for each color the controller drives four ink jet heads 32, 33, 34 and 35 corresponding to cyan, magenta, yellow, and black, respectively, in a controlled manner. Further, the controller drives a head moving mechanism 36 that allows the heads 32 to 35 to travel and back in the direction of rotation axis of a rotating drum, a paper feeding motor 37 that feeds printing paper to the rotating drum, a drum motor 38 that drives the rotating drum into rotation, and a paper fixing device 39 equipped with an electrifying roller for electrification-fixing the printing paper wound around the rotating drum.

The printer engine 122, which is provided with a head-mounted device which has the heads 32 to 35 mounted in line along the direction of the axis of rotation of the rotating drum and which is moved and back by the head moving mechanism, winds printing paper fed by the paper feeding motor 37 around the rotating drum, electrification-fixes the paper to the drum, rotates the rotating drum by the drum motor 38, drives the ink jet heads 32 to 35 on the basis of data to be printed, and drives the head-mounted device by the head moving mechanism 36. In this sequence of operations, when the rotating drum makes one rotation, each of the ink jet heads 32 to 35 is shifted by half the ink nozzle spacing and then driven on the basis of data to be printed. When the rotating drum makes two rotations, printing onto a sheet of paper terminates. This procedure allows printing to be made at twice the resolution corresponding to the spacing between each ink nozzle in the ink jet heads 32 to 35.

The function of the halftoning section 23, which forms the main part of the present invention, will be described in terms of an example of converting input multivalued image data of 8 bits and 256 tone levels (0: white, 255: black) into a multivalued image data of 3 bits and 8 tone levels for each color (0: white, 7: black) through a pseudo-halftoning process.

When the printer 12 has the ability to manipulate an image having 3 bits of data for each color, the halftone process can provide multivalued image data of 3 bits for each color. Using seven dot sizes for each pixel as shown in FIG. 4, a total of seven tones can be reproduced within one pixel for each color. In general, the dot sizes are adjusted beforehand for each color so that a linear density characteristic can be obtained.

The dot at the maximum level of shading, i.e., at the 7 level becomes such a circle as fully covers a square pixel defined by the resolution of the printer engine 122 as shown.

The basic algorithm for the multilevel error diffusion process performed by the halftoning section 23 will be described below with reference to FIG. 5.

In the multilevel error diffusion process, an image signal corrector 41 adds an input image signal Din with 256 levels and an image correction signal Ecd together to obtain a corrected image signal Dinc. The corrected image signal Dinc is then applied to a 256-valued data to N-valued data conversion table, for example, a 256-values data to 8-valued data conversion table 42 to provide an 8-valued image signal Dout. In the conversion table, seven thresholds are set for input multivalued data having shades in a range of 0 to 255. Depending on which of the seven thresholds input multi-valued data is larger or smaller than, the input data is converted to eight-valued image data in a range of 0 through 7. The conversion table may be implemented by logic or a memory such as ROM or RAM.

The difference between the corrected image signal Dinc and the eight-valued image signal (normalized in the range of 0 through 255) is calculated by an error calculator 43 to provide an error signal Er. This error signal Er is then multiplied in a weighted error calculator 44 by weighting factors from a weighting factor memory 45 to obtain a weighted error signal Erh. The symbol * depicted in the weighting factor memory 45 indicates the position of a pixel of interest. Here, four pixels around the pixel of interest are the subject of processing. The generally known assignment of the weighting factors A, B, C and D for those four pixels in the weighting factor memory 45 is such that A=7/16, B=3/16, C=5/16, and D=1/16 as shown in FIG. 6A. To increase the uniformity of dot distribution, such an assignment as shown in FIG. 6B is also generally known.

The weighted error signal Erh from the weighted error calculator 44 is accumulated in the corresponding location in an error memory 46 that stores the weighted error signal for one line. That is, in the error memory 46, * indicates the position of a focussed pixel and weighted errors EA, EB, EC and ED are stored for the four pixels around the focussed pixel.

By repeating the addition of the input image signal Din and the corresponding image correction signal Ecd stored in the error memory 46 by the image signal corrector 41 and the conversion of the corrected image signal Dinc into an eight-valued image signal by the conversion table 42, an eight-valued image signal for one page of printing paper can be obtained.

Next, consider the case of applying such a multilevel error diffusion process to a line ink jet printer of poor printing accuracy. Usually, the error diffusion procedure is an algorithm to arrange dots so that the average optical density becomes as uniform as possible over a region of certain size and the spatial frequency becomes high. When an image which, like a patch image, is uniform in density is processed, a printed image is made from a substantially uniform dot pattern. This is because the bilevel error diffusion process allows an output image to be formed from combinations of black and white dots, whereas the multilevel error diffusion process allows the shades of gray between black and white to be taken.

However, when a certain shade in a patch image is processed, the dots are formed so that the spatial frequency is kept high with one or two tone levels corresponding to the nearby density.

Such a multilevel error diffusion process is the optimum tone reproduction approach for the ideal printing system with no problem of printing accuracy. In many cases, however, a problem lies usually in the fact that the ink nozzles are subject to variations. In the presence of such variations, the multilevel error diffusion process will make density nonuniformity and white stripes more noticeable.

Figure 7:
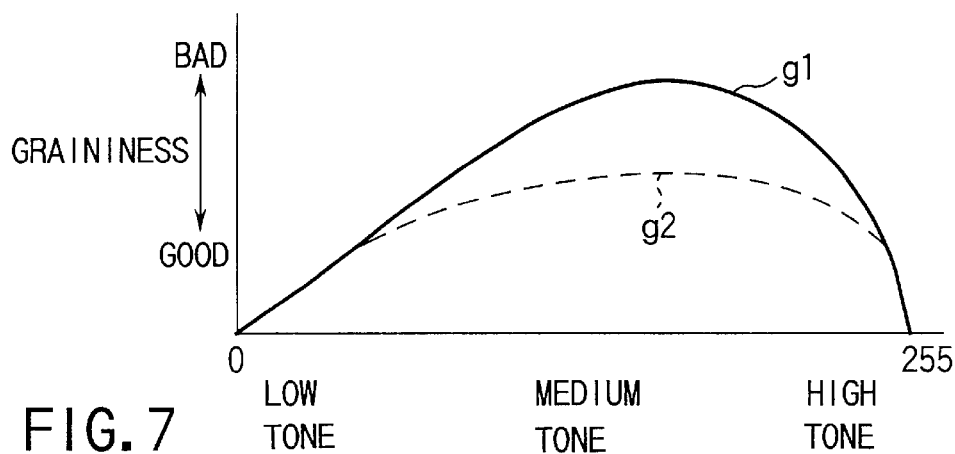
FIG. 7 is a graphical representation of the degrees of influence of density nonuniformity and a line on the human visual system in low- to high-degradation regions.

In printers that represent tones by area modulation, the density nonuniformity is not visually recognized equally for each tone range. The experimental results show that the degree to which the density nonuniformity is noticeable has such a tendency as indicated by a solid curve gl in FIG. 7. As can be seen, the density nonuniformity and lines are most noticeable in the medium to high shade range.

Thus, there is no need of making corrections in all the tone ranges. In the low tone range of 0 to 30%, the multilevel error diffusion process is performed without modification. In the medium to high tone range in which density nonuniformity and stripes are most noticeable, on the other hand, the pattern in which dots appear is changed, so that the substantial resolution is reduced. This procedure lessens the influence of density nonuniformity and stripes as indicated by a dotted curve g2 in FIG. 7 but improves the overall image quality relatively. Incidentally, a boundary between a low tone range and a medium or a high tone range is a relative one, not a substantially clearly distinguishable one. This is because the range over which an optimal tone reproduction can be achieved with its resolution kept depends upon the degree of printing accuracy and kinds of color.

In addition, the use of this approach can solve a problem with recent ink jet printers that the reproduction of tones in highlights is sacrificed.

Figure 8:
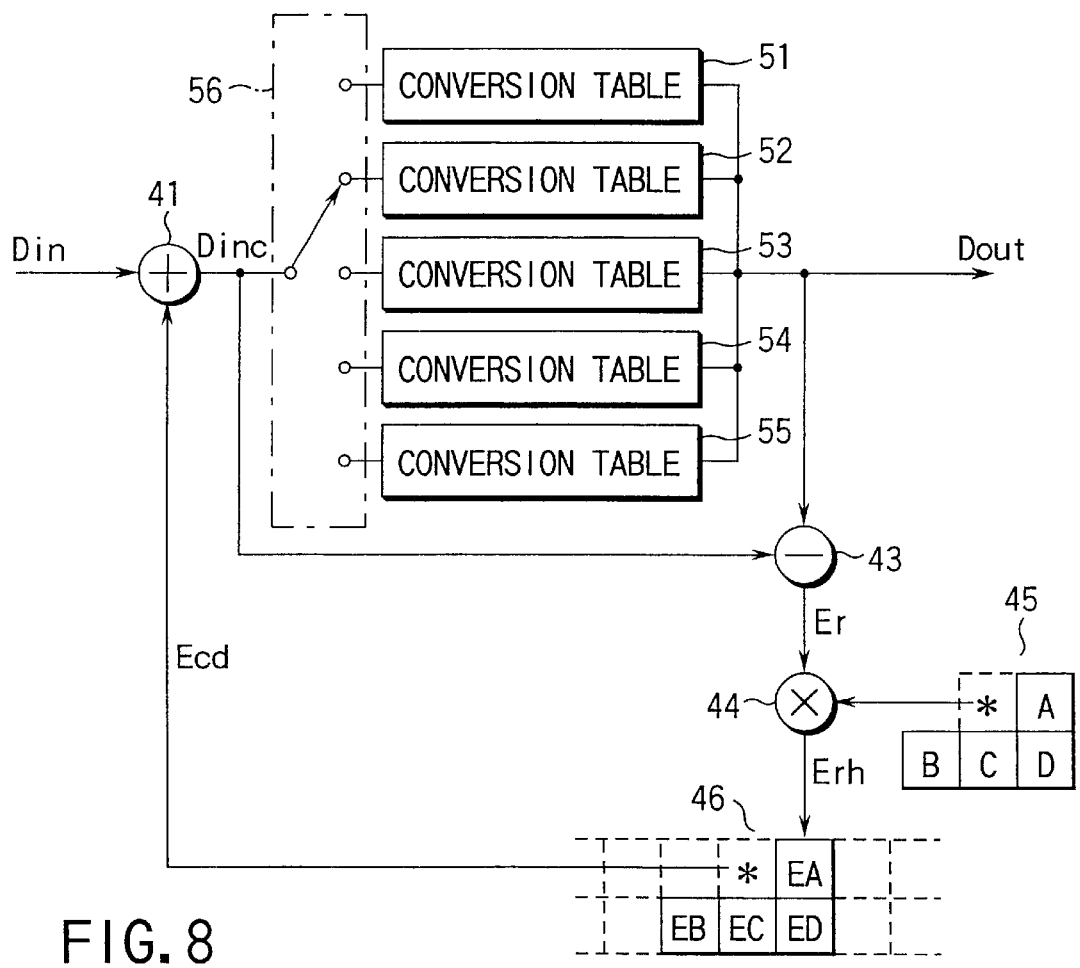
FIG. 8 is a block diagram illustrating a specific arrangement of the halftone processing section in the first embodiment.

FIG. 8 shows a specific arrangement of the halftoning section 23 for implementing the above approach. The halftoning section performs the multilevel error diffusion process and its arrangement remains basically unchanged from that of FIG. 5 except in the provision of five 256- to 8-value conversion tables 51, 52, 53, 54, and 55 and a switch 56 adapted to selectively input the corrected image signal Dinc to one of the conversion tables 51 to 55.

The threshold settings in the conversion tables 51 to 55 are as follows: The conversion table 51 has thresholds set such that Th1=18, Th2=38, Th3=59, Th4=80, Th5=116, Th6=169, and Th7=229. The conversion table 52 has threshold settings of Th1=18, Th2=46, Th3=75, Th4=104, Th5=140, Th6=185, and Th7=233. The conversion table 53 has threshold settings of Th1=18, Th2=54, Th3=91, Th4=128, Th5=164, Th6=201, and Th7=237. The conversion table 54 has threshold settings of Th1=18, Th2=62, Th3=107, Th4=152, Th5=188, Th6=217, and Th7=241. The conversion table 55 has threshold settings of Th1=18, Th2=70, Th3=123, Th4=176, Th5=212, Th6=233, and Th7=245.

In the conversion tables 51 to 55, the threshold Th1 for converting a corrected image signal Dinc in the low tone range to 0 and 1 is set to 18 for all the tables. The thresholds Th2, Th3, Th4, Th5, Th6, and Th7 that convert a corrected image signal Dinc in the medium to high shade range to 1, 2, 3, 4, 5, 6, or 7 are set to increase in that order in each of the conversion tables. The difference between corresponding thresholds in successive conversion tables is set to 8 for Th2, 16 for Th3, 24 for Th4, 24 for Th5, 16 for Th6, and 4 for Th7. The difference is maximum at Th4 and Th5.

Thus, the conversion tables 51 to 55 produce the same output for a corrected image signal Dinc in the low tone range but provide different outputs for a corrected image signal in the medium or high tone range.

For example, when an input corrected image signal Dinc is 20, any of the conversion tables 51 to 55 provides an output value of 1. When an input signal Dinc is 130, the conversion table 51 provides an output value of 5, the conversion table 52 provides an output value of 4, the conversion table 53 provides an output value of 4, the conversion table 54 provides an output value of 3, and the conversion table 55 provides an output value of 3. If, when an input corrected image signal Dinc having a tone at a level of 130 is entered, the conversion table 51 is selected, then printing is made at a dot size of the 5 level shown in FIG. 4. If, at that time, the conversion table 52 or 53 is selected, then printing is made at a dot size of the 4 level shown in FIG. 4. If the conversion table 54 or 55 is selected, then printing is made at a dot size of the 3 level shown in FIG. 4.

That is, printing can be made at a different dot size depending on which of the conversion tables is selected for an input corrected image signal Dinc. This increases the types of dot patterns to appear, allowing density nonuniformity and stripes to be reduced.

It is ideal for the conversion tables 51 to 55 to have their respective thresholds set such that density nonuniformity and stripes become difficult to notice. With the error diffusion process, however, since an input corrected image signal Dinc, even when inputting a shade patch at a shade level of 130, is subjected to addition and subtraction for error correction, it takes a value other than 130. The difference between the output image signal and the input corrected image signal is calculated in the error calculator 43. In the error calculator, since the difference between the input corrected image signal and the output image signal subjected to equal normalization of the shade range of 0 through 255 to seven levels is calculated, an error value for a dot outputted actually is diffused through. unprocessed pixels and accumulated.

Thus, when the input corrected image signal Dinc is an image signal in the low tone range in which density nonuniformity and stripes are relatively difficult to notice, the same output is obtained from any of the conversion tables 51 to 55 having the same value for threshold Th1, allowing the substantial resolution to be maintained. For an input corrected image signal Dinc in the middle or high tone range in which density nonuniformity and stripes are noticeable, a selection is made randomly among the conversion tables 51 to 55 by means of the switching means 56 to thereby vary its output value. This can change the size of dots printed by the ink jet head to increase the number of dot patterns that appear on printing paper and hence reduce density nonuniformity and stripes. In addition, since it is only required to provide five conversion tables having different thresholds for image signals in the medium to high tone range and a switching means for making randomly a selection from these table, the construction is simple and can be readily implemented using a multilevel error scattering technique.

The switch means 56 may be changed over periodically using a simple counter or the like. In this case, depending on the error diffusion algorithm, the randomness of dot appearance takes effect, providing the same advantages as when the switch means is changed over in a random manner. The construction in that case becomes more simpler.

For color images, an image is formed using four color inks of C (cyan), M (magenta), Y (yellow), and K (black) ejected from the ink jet heads 32 to 35, respectively. It is known that the effect of density nonuniformity and stripes on the human visual system varies with colors. In general, with the same printing accuracy, the effect of density nonuniformity and stripes on the human visual system varies in the order K, M, C, and Y, beginning with the strongest. That is, an image printed in black ink is the easiest to notice density nonuniformity and stripes. An image printed in yellow ink is the most difficult. Thus, the use of the most suitable multilevel error diffusion process for each color allows for the production of an image of higher quality in which density nonuniformity and stripes are reduced.

For example, to subject a black image signal Dinc to the multilevel error diffusion process, the conversion tables 51 to 55 are used which have such threshold settings as shown in FIG. 9.

For a yellow image signal Dinc, conversion tables 511 to 551 are used which have such threshold settings as shown in FIG. 10.

In the conversion tables 511 to 551, the threshold Th1 for converting a corrected image signal Dinc in the low shade range to 0 or 1 is set to 18 for all the tables. The thresholds Th2, Th3, Th4, Th5, Th6, and Th7 that convert a corrected image signal Dinc in the medium to high shade range to 1, 2, 3, 4, 5, 6, or 7 are set to increase in that order in each of the conversion tables. The difference between corresponding thresholds in successive conversion tables is set to 4 for Th2, 8 for Th3, 12 for Th4, 12 for Th5, 8 for Th6, and 2 for Th7. The difference is maximum at Th4 and Th5. The difference for each threshold is half of the corresponding difference in FIG. 9. In the conversion tables 511 to 551, the maximum of differences between corresponding thresholds is 48, the difference between the conversion tables 511 and 551 for thresholds Th4 and Th5. This is half the difference between the conversion tables 51 and 55 for thresholds Th4 and Th5, which is the maximum of differences between corresponding thresholds in the conversion tables 51 to 55 shown in FIG. 9. The thresholds Th2, Th3, Th4, Th5, Th6 and Th7 in the conversion table 511 are set larger than Th2, Th3, Th4, Th5, Th6 and Th7, respectively, in the conversion table 51 in FIG. 9.

To perform the multilevel error diffusion process on a cyan and a magenta image signal Dinc, conversion tables 512, 522, 532, 542 and 552 are used which have threshold settings shown in FIG. 11.

In the conversion tables 512 to 552, the threshold Th1 for converting a corrected image signal Dinc in the low shade range to 0 or 1 is set to 18 for all the tables. The thresholds Th2, Th3, Th4, Th5, Th6, and Th7 that convert a corrected image signal Dinc in the medium to high shade range to 1, 2, 3, 4, 5, 6, or 7 are set to increase in that order in each of the conversion tables. The difference between corresponding thresholds in successive conversion tables is set to 6 for Th2, 12 for Th3, 18 for Th4, 18 for Th5, 12 for Th6, and 3 for Th7. The difference is maximum at Th4 and Th5. The difference with respect to each threshold is midway between the corresponding differences in FIGS. 9 and 10. In the conversion tables 512 to 552, the maximum of differences between corresponding thresholds is 72, the difference between the conversion tables 512 and 552 with respect to thresholds Th4 and Th5. The thresholds Th2, Th3, Th4, Th5, Th6 and Th7 in the conversion table 512 are each set to between the corresponding thresholds in the conversion table 51 of FIG. 9 and the conversion table 511 in FIG. 10.

In converting a multilevel corrected image signal Dinc to an eight-level output image signal through the multilevel error diffusion process based on multilevel to eight-level conversion tables, for a black image in which density nonuniformity and stripes are noticeable the five conversion tables 51 to 55 shown in FIG. 9 are used and switched at random by the switch means 56. Thereby, although the substantial resolution becomes lower relative to other color images, density nonuniformity and stripes are significantly reduced compared to the other color images.

For a yellow image in which density nonuniformity and stripes are difficult to be noticed, the five conversion tables 511 to 551 shown in FIG. 10 are used and switched at random by the switching means 56, thereby keeping the substantial resolution higher relative to other color images. For a cyan and a magenta image, the five conversion tables 512 to 552 shown in FIG. 11 are used.

In this manner, for color images as well, density nonuniformity and stripes can be reduced and moreover the reduction in substantial resolution can be minimized to increase printing quality.

Although the first embodiment has been described as using five multilevel to eight-level conversion tables, the number of conversion tables is illustrative and not restrictive.

[Second Embodiment]

Here, another embodiment will be described which reduces density nonuniformity and stripes in color images. Although the first embodiment has been described using five multilevel to eight-level conversion tables for each of color images (a black image, a yellow image, and a cyan and a magenta image) and varying their threshold settings with the color images, in the second embodiment the number of conversion tables used is changed according to color images.

For a black image in which density nonuniformity and stripes are easy to be noticed, as in the first embodiment, the five conversion tables 51 to 55 shown in FIG. 9 are used and switched at random or periodically by the switching means 56. Thus, although the substantial resolution becomes lower relative to other color images, density nonuniformity and stripes are significantly reduced compared to the other color images.

For a yellow image in which density nonuniformity and stripes are difficult to be noticed, a single conversion table 60 as shown in FIG. 12A is used so that the substantial resolution is increased. This conversion table has thresholds set such that Th1=18, Th2=54, Th3=91, Th4=128, Th5=164, Th6=201, and Th7=237.

For a cyan and a magenta image which is between black and yellow images in the degree to which density nonuniformity and stripes are noticeable, three conversion tables 61, 62 and 63 are used as shown in FIG. 12B, which are switched at random or periodically by switching means 56 for multilevel error diffusion process.

The conversion table 61 has thresholds set such that Th1=18, Th2=36, Th3=72, Th4=108, Th5=144, Th6=180, and Th7=216. The conversion table 62 has thresholds set such that Th1=18, Th2=54, Th3=91, Th4=128, Th5=164, Th6=201, and Th7=237. The conversion table 63 has thresholds set such that Th1=18, Th2=73, Th3=109, Th4=145, Th5=181, Th6=217, and Th7=246.

By varying the number of multilevel to eight-level conversion tables used according to a black image, a yellow image, a cyan image, or a magenta image in that manner, density nonuniformity and stripes can be reduced in color images and moreover a reduction in substantial resolution can be minimized to increase printing quality.

Although the second embodiment has been described as using five conversion tables for a black image, one conversion table for a yellow image, and three conversion tables for a cyan and a magenta image, this is illustrative and not restrictive.

[Third Embodiment]

In the second embodiment described above, the number of conversion tables used is changed according to colors to be printed, while, in this embodiment, the number of conversion tables used or the threshold settings of the 256-values data to 8-valued data conversion table is changed according to the printing accuracy of ink ejected from ink nozzles.

In general, there are variations in the volume and direction of ejected ink from each ink nozzle of an ink jet head. Manufactured ink jet heads themselves also show variations in performance due to accuracy in manufacture. Such variations appear as variations in printing accuracy. Variations in printing accuracy lead to the occurrence of density nonuniformity and stripes.

Optimum number of conversion tables used in the multilevel error diffusion process are set according to the degree of the occurrence of density nonuniformity and stripes due to printing accuracy. Thereby, an image is formed at such a maximum resolution that density nonuniformity and stripes are not noticeable. For example, when printing is made at an accuracy of ±5 μm in standard deviation with respect to a reference position, the number of conversion tables used is set to three. On the other hand, when printing is made at an accuracy of ±10 μm in standard deviation with respect to a reference position, the number of conversion tables used is set to five.

By adjusting the number of conversion tables used to the degree of printing accuracy in this manner, a reproduction of halftoning can be achieved which is the most suitable for ink jet heads. Of course, this can be performed for each color of a color image. In this case, threshold parameters are set in each of conversion tables used as shown in FIGS. 9 and 10 according to a degree of printing accuracy. Further, the individual threshold levels on the eight-level tables are set such that, as shown in FIGS. 9 and 10, an image of a maximum resolution not prominent in density nonuniformity and white stripes can be formed even by changing the threshold level difference between the respective tables in accordance with the degree of the printing accuracy. Needless to say, an image of a maximal resolution not remarkable in density nonuniformity and white stripes can be formed even in a color image by changing a threshold level difference between the tables in accordance with the degree of printing accuracy at each color of the color image. Thus, the most suitable multilevel error diffusion process can be performed on ink jet heads according to their respective printing accuracy to increase printing quality.

[Fourth Embodiment]

Figure 13:
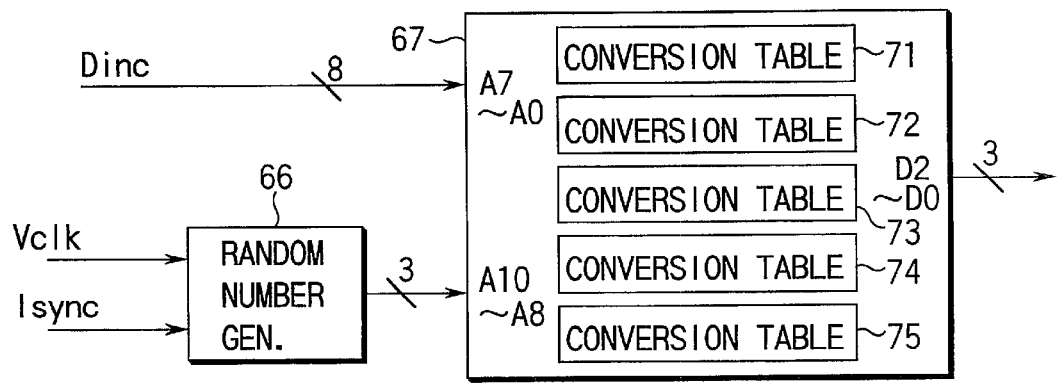
FIG. 13 shows a switching means and multilevel-to-octal conversion tables in a fourth embodiment of the present invention.

Although the first embodiment has been described as switching the five conversion tables at random by means of the switching means 56 consisting of a changeover switch, the fourth embodiment uses a switching means consisting of a five-random-number generator 66 as shown in FIG. 13 and a memory 67, such as a RAM, in which five conversion tables 71, 72, 73, 74, and 75 have been set up.

The fourth embodiment is arranged such that threshold data are sequentially downloaded from outside into the conversion tables 71 to 75 in the memory 67. Prior to the commencement of a multilevel error diffusion process, such conversion values in the form of a table as shown in FIG. 9 or 10 are downloaded into each of the conversion tables.

A corrected image signal Dinc is assigned to the low-order eight bits A7 to A0 on the address bus of the memory 67. A signal from the random number generator 66 is assigned to the high-order three bits A10 to A8 so as to enable the conversion tables 71 to 75 to be switched. Although five conversion tables are used here, the use of three bits for table switching allows for the setup of up to eight conversion tables.

The use of eleven address bits A10 to A0 allows the conversion tables 71 to 75 in the memory 67 to be switched at random and an 8-bit corrected image signal Dinc to be converted into an output image signal consisting of three bits D2 to D0.

The fourth embodiment in which the switching means is formed from the random number generator 66 and the conversion tables are set up in the memory 67 such as RAM will also provide the same advantages as the previously described embodiments.

The embodiments of the present invention described so far allow density nonuniformity and stripes to be reduced through the use of a simple hardware implementation using multilevel to smaller-number-of-level conversion tables and a switching means, which results in a reduction in cost.

Figure 14:
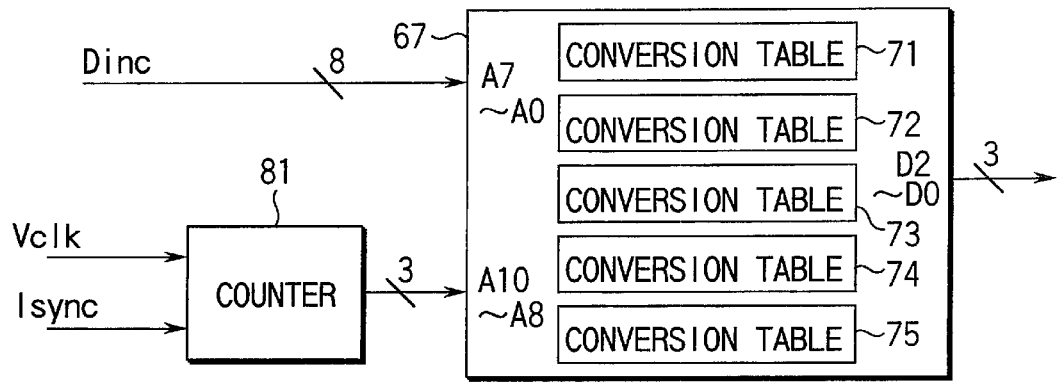
FIG. 14 shows a modification of the fourth embodiment of the present invention.
Figure 15:
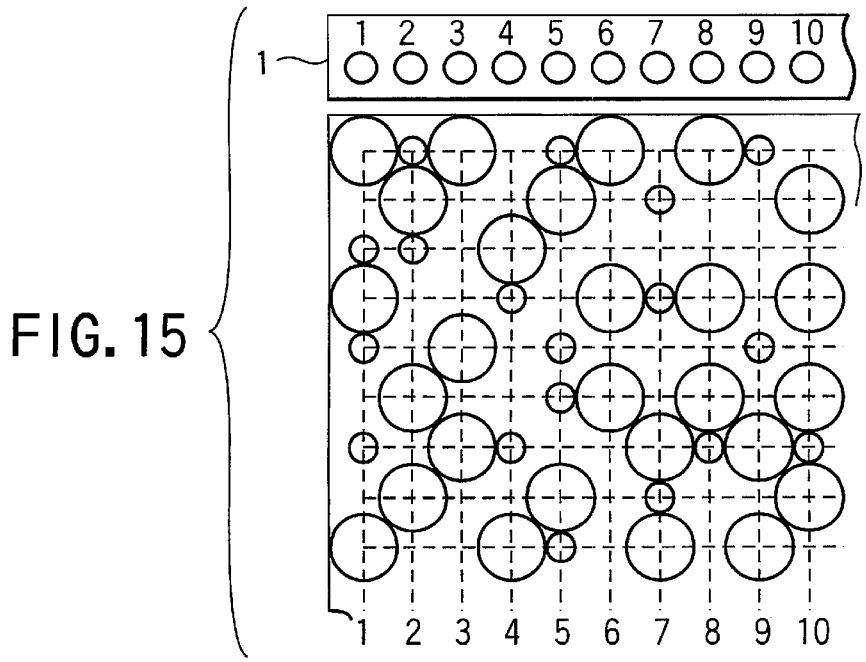
FIG. 15 shows an example of printing by a conventional line recording head.

If the random number generator 66 is replaced with a counter 81 as shown in FIG. 14, the conversion tables can be switched periodically in a given order.

The embodiments of the present invention have been described in terms of conversion of 8-bit image data with 256 tone levels into 3-bit image data with eight tone levels; however, this is not restrictive. In a broader sense, the present invention contemplates conversion of input multilevel image data with each pixel accompanied by M bits into output multilevel image data with each pixel accompanied by N bits (M>N≧1), i.e., a smaller tone number of shades, through a multilevel error diffusion process.

The multilevel error diffusion scheme need not be limited to those used in the previously described embodiments as long as an essential definition of multilevel error diffusion is satisfied.

The embodiments have been described in terms of an application of the image formation device to color ink jet printers; however, this is not restrictive. The present invention can also be applied to monochrome ink jet printers, thermal printers, LED printers, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method for converting input multilevel image data in which each pixel consists of M bits of data into output multilevel image data in which each pixel consists of N (M>N≧1) bits of data so that the output multilevel image data has a smaller.number of tone levels than the input multilevel image data through a multilevel error diffusion process and producing dot patterns according to the tone levels of the output multilevel image data, wherein the multilevel error diffusion processing is such that, when the input multilevel image data is in a range from medium to high tone levels, the types of dot patterns produced by converting input multilevel image data of the same level are larger in number than those produced by converting input multilevel image data of the same level when the input multilevel image data is in a range of low tone levels.

2. An image processing device comprising:

a plurality of conversion tables connected to receive input multilevel image data in which each pixel consists of M bits of data for converting it into output multilevel image data in which each pixel consists of N bits of data, the conversion tables having different conversion threshold settings for multilevel image data in a range from medium to high tone levels such that the types of dot patterns produced by converting input multilevel image data of the same level are larger in number than those produced by converting input multilevel image data of the same level when the input multilevel image data is in a range of low tone levels;

switching means for selectively switching the conversion tables for use in conversion of the input multilevel image data; and multilevel error diffusion process means for performing a multilevel error diffusion process using the conversion tables selected by the switching means to convert the M-bit input multilevel image data into the N-bit output multilevel image data.

3. The image processing device according to claim 2, wherein the switching means is operated at random.

4. The image processing device according to claim 2, wherein the switching means is operated periodically.

5. An image formation device comprising:

a plurality of conversion tables connected to receive input multilevel image data in which each pixel consists of M bits of data for converting it into output multilevel image data in which each pixel consists of N bits of data, the conversion tables having different conversion threshold settings for multilevel image data in a range from medium to high tone levels such that the types of dot patterns produced by converting input multilevel image data of the same level are larger in number than those produced by converting input multilevel image data of the same level when the input multilevel image data is in a range of low tone levels;

switching means for selectively switching the conversion tables for use in conversion of the input multilevel image data;

multilevel error diffusion process means for performing a multilevel error diffusion process using the conversion tables selected by the switching means to convert the M-bit input multilevel image data into the N-bit output multilevel image data; and printing means for printing according to said N bits image data.

6. The image formation device according to claim 5, wherein the switching means is operated at random.

7. The image formation device according to claim 5, wherein the switching means is operated periodically.

8. The image formation device according to claim 5, wherein the switching means is operated so that the types of dot patterns which can be produced onto the image formation device by multilevel image data resulting from conversion of input multilevel image data in a range from medium to high tone levels vary according to the printing accuracy.

9. The image formation device according to claim 8, wherein the switching means is operated at random.

10. The image formation device according to claim 8, wherein the switching means is operated periodically.

11. The image formation device according to claim 5, wherein the number of the conversion table is changed according to the printing accuracy so that the types of dot patterns which can be produced onto printing paper in a printer by multilevel image data resulting from conversion of input multilevel image data in a range from medium to high tone levels vary according to the printing accuracy.

12. The image formation device according to claim 11, wherein the switching means is operated at random.

13. The image formation device according to claim 11, wherein the switching means is operated periodically.

14. The image formation device according to claim 5, wherein said image formation device is an ink jet printer.

15. An image processing device comprising:

a plurality of conversion tables connected to receive input multilevel color image data in which each pixel consists of M bits of data for converting it into output multilevel color image data in which each pixel consists of N bits of data, the conversion tables having different conversion threshold settings for multilevel color image data in a range from medium to high tone levels such that the types of dot patterns produced by converting input multilevel image data of the same level are larger in number than those produced by converting input multilevel image data of the same level when the input multilevel image data is in a range of low tone levels;

switching means for selectively switching the conversion tables for use in conversion of the input multilevel color image data; and multilevel error diffusion process means for performing a multilevel error diffusion process using the conversion tables selected by the switching means to convert the M-bit input multilevel color image data into the N-bit output multilevel color image data.

16. The image processing device according to claim 15, wherein the switching means is operated at random.

17. The image processing device according to claim 15, wherein the switching means is operated periodically.

18. An image formation device comprising:

a plurality of conversion tables connected to receive input multilevel color image data in which each pixel consists of M bits of data for converting it into output multilevel color image data in which each pixel consists of N bits of data, the conversion tables having different conversion threshold settings for multilevel color image data in a range from medium to high tone levels such that the types of dot patterns produced by converting input multilevel image data of the same level are larger in number than those produced by converting input multilevel image data of the same level when the input multilevel image data is in a range of low tone levels;

switching means for selectively switching the conversion tables for use in conversion of the input multilevel color image data;

multilevel error diffusion process means for performing a multilevel error diffusion process using the conversion tables selected by the switching means to convert the M-bit input multilevel color image data into the N-bit output multilevel color image data; and printing means for printing according to said N bits image data.

19. The image processing device according to claim 18, wherein the switching means is operated at random.

20. The image processing device according to claim 18, wherein the switching means is operated periodically.

21. The image formation device according to claim 18, wherein the switching means is operated so that the types of dot patterns which can be produced onto the image formation device by multilevel color image data resulting from conversion of input multilevel color image data in a range from medium to high tone levels vary according to the printing accuracy.

22. The image formation device according to claim 21, wherein the switching means is operated at random.

23. The image formation device according to claim 21, wherein the switching means is operated periodically.

24. The image formation device according to claim 18, wherein the number of the conversion table is changed according to the printing accuracy so that the types of dot patterns which can be produced onto printing paper in a printer by multilevel color image data resulting from conversion of input multilevel color image data in a range from medium to high tone levels vary according to the printing accuracy.

25. The image formation device according to claim 24, wherein the switching means is operated at random.

26. The image formation device according to claim 24, wherein the switching means is operated periodically.

27. The image formation device according to claim 18, wherein said image formation device is an ink jet printer.

* * * * *